United States Patent [19]
Gause et al.

[11] 3,820,529
[45] June 28, 1974

[54] CONDUCTIVE ELASTOMERIC EXTENSOMETER

[75] Inventors: Raymond L. Gause, Huntsville; C. G. Glenn, Arab, both of Ala.

[73] Assignee: The United States of America as represented by the Administrator of the National Aeronautics and Space Administration, Washington, D.C.

[22] Filed: Nov. 7, 1972

[21] Appl. No.: 304,430

[52] U.S. Cl............... 128/2 S, 73/88.5 R, 338/5, 338/114
[51] Int. Cl............................................. A61b 5/10
[58] Field of Search................ 128/2 S, 2.1 R, 2.08; 73/88.5, 398 R; 119/106, 96; 338/2, 5, 114, 47

[56] References Cited
UNITED STATES PATENTS

| | | | |
|---|---|---|---|
| 2,550,588 | 4/1951 | Oberholtzer | 73/88.5 R |
| 2,734,978 | 2/1956 | Bulgin | 338/114 |
| 3,268,845 | 8/1966 | Whitmore | 338/47 |
| 3,520,294 | 7/1970 | Fuzzell et al. | 128/2.5 |

FOREIGN PATENTS OR APPLICATIONS
1,482,984  4/1966  France................ 128/208

*Primary Examiner*—Aldrich F. Medberry
*Attorney, Agent, or Firm*—L. D. Wofford, Jr.; W. H. Riggins; John R. Manning

[57] ABSTRACT

An extensometer for measuring surface area changes of the human body caused by expansion and contraction of the body comprising a relatively thin and wide strain responsive conductive elastomeric band adapted for application to a part of the body, such as around a limb or the trunk of the body. The elastomeric band is incorporated as a resistor in a balanced bridge circuit. Expansion or contraction of the portion of the body on which the elastomeric band is applied causes a change in the resistance of the band and a resultant imbalance of the bridge circuit generating an output that is fed into an amplifier. The output of the amplifier in volts is suitable for providing the desired reading through a recorder, oscilloscope or voltmeter.

3 Claims, 3 Drawing Figures

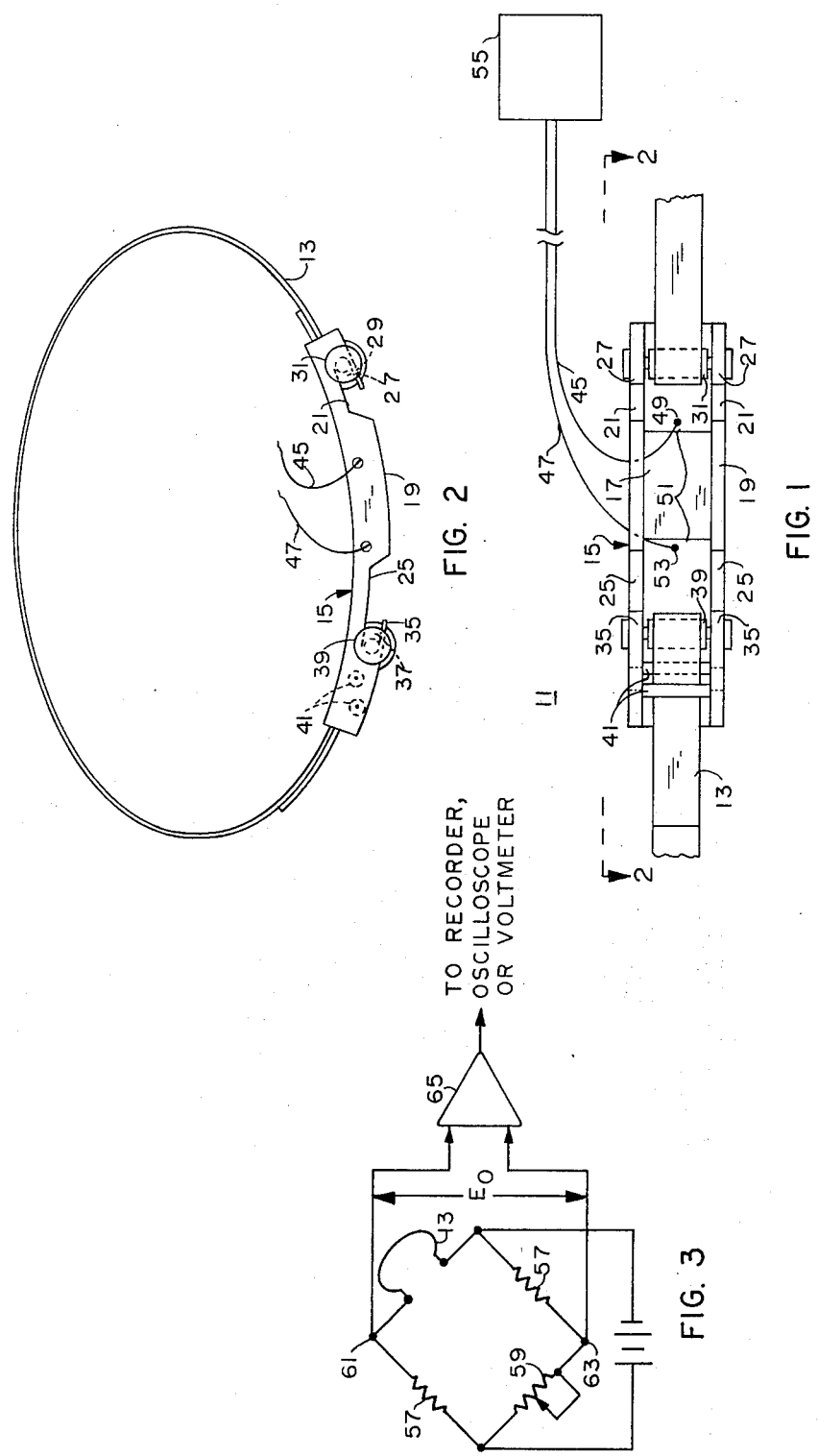

CONDUCTIVE ELASTOMERIC EXTENSOMETER

ORIGIN OF THE INVENTION

The invention described herein was made by employees of the U.S. Government and may be manufactured and used by or for the Government for Governmental purposes without the payment of any royalties thereon or therefor.

BACKGROUND OF THE INVENTION

This invention relates generally to devices for measuring expansion and contraction, and more particularly, to an extensometer for precisely measuring surface area changes of selected portions of the human body caused by expansion and contraction of the body portions.

Various prior art devices are currently used in recognized medical research and diagnostic techniques for detecting and measuring surface area changes of the human body caused by body expansion and contraction produced by occurrences such as heartbeat, inhaling and exhaling, exercising, flexing of the muscles and by subjecting the body to vacuum environments. These prior art devices include the "Hall Effect" extensometer, the mercury filled plastic extensometer, the phototube plethysmograph and the water plethysmograph.

The prior art devices present one or more of certain disadvantages including a severely limited area contact between the sensing element of the extensometer and the body surface as well as inconvenience of use and costly production of the devices.

A need for a more sensitive and conveniently used extensometer for detecting and measuring expansion and contraction of the human body appears in conducting medical experiments in space and in monitoring physiological responses of crewmen during prolonged flights in the vacuum environment of space.

It is therefore a general object of the present invention to provide an improved extensometer.

A more specific object of the invention is to provide an economically produced extensometer for detecting and measuring expansion and contraction of the human body that permits greater contact between the sensing element of the extensometer and the surface of the body affording increased sensitivity, comfort and convenience in using the extensometer.

Another object of the invention is to provide an extensometer having sensitivity and precision capabilities as well as convenience of use suitable for use in conducting medical experiments in space and for monitoring the physiological response of crewmen to extended exposure to the vacuum and zero gravity environment of space.

These and other objects and advantages of the invention will become apparent upon reference to the following specification attendant claims and drawing.

BRIEF DESCRIPTION OF THE DRAWING

FIG. 1 is a plan view showing principal components of the extensometer and their relationships.

FIG. 2 is a view taken along line 2—2 of FIG. 1.

FIG. 3 shows a bridge circuit incorporated in the extensometer.

DESCRIPTION OF THE PREFERRED EMBODIMENT

Referring to FIG. 1 of the drawing, extensometer, designated generally at 11, comprises a conductive elastomeric band 13 having opposite ends releasably connected to a latch 15. The band 13 has the general appearance and feel of ordinary rubber; however, the composition of the band is formulated to render it electrically conductive to a degree suitable for the purposes to be set forth hereinafter.

In one embodiment of the invention the band 13 was made one-half inch in width, one-sixteenth inch in thickness, and was composed of 400 parts silicon elastomer, 200 parts conductive carbon black and 32 parts dicumyl peroxide (40 percent). One product designation of the silicon elastomer is General Electric Co. SE 33 and one commercial designation of the conductive carbon black is Shawinigan Black. The resistance of the band may be varied by varying the constituent proportion of conductive carbon black. The resistance of one band employed ranged from 12,000 ohms to 18,000 ohms per foot when the band was in the relaxed condition and increased to 24,000 ohms to 32,000 ohms per foot when elongated by 1 inch per foot.

The body of the latch 15 is an integral unit of phenolic material being arcuate in length to conform to curved surfaces of the body, such as the arms and legs. The latch body comprises a base 17 with integral opposite sides 19 projecting at right angles to the base 17. Grooves 21 are formed opposite each other in the sides 19 near one end of the latch and similar, though not identical, grooves 25 are formed in the sides 19 near the opposite end of the latch. Overlying a portion of each of the grooves 21 is a resilient extension 27 that forms a slot 29 for receiving an aluminum latch pin 31 around which one end portion of the band 13 is tightly wrapped and secured. The portions of the pin 31 that fit in the slots 29 are reduced in diameter and fit tightly but releasably in the slots 29.

Overlying the grooves 25 are resilient extensions 35 to provide slots 37 that receive an aluminum pin 39 around which the other end portion of the band 13 is wrapped. The pin 39 is somewhat more firmly retained than is the pin 31. The band 13 at this end of the latch 15 is adjustable in length in that the overlapping portions of the band are not bonded together but are tightly clamped between a pair of small diameter rollers 41 that are slightly spaced lengthwise and vertically and permit rapid adjustment of the band length by pulling the appropriate overlapped portion. During adjustment the rollers 41 turn as well as the pin 39.

A thin layer of conductive metal such as copper is provided over certain areas of the phenolic body of the latch 15 to provide good electrical contact between the pin 31 and a lead wire 45 and between the pin 39 and a second lead wire 47. The wire 45 is shown connected at 49 to a copper layer 51 and the wire 47 is shown connected at 53 to a copper layer 51. The copper layer is also extended at each end of the latch to continue over the entire surface of the grooves 21 and 25 and the slots 29 and 37 so that the pins 31 and 39 fitting in these slots will be in firm electrical contact with the wires 45 and 47.

The wires 45 and 47 extend to a small housing indicated at 55 containing the circuitry and controls for the extensometer.

A bridge circuit shown in FIG. 3 includes opposite and equal resistors 57, and a variable resistor 59 opposite a leg of the circuit that includes the conductive elastomeric band 13. When the band is applied to the part of the human body under study the bridge circuit is balanced by the variable resistor 59. Thereafter, any change in the strain imposed on the band 13 by expansion or contraction of the human body causes an imbalance in the bridge circuit and a potential difference between terminals 61 and 63. The output through these terminals is fed into an integrated circuit amplifier 65 the output of which is suitable for providing a desired reading through a recorder, oscilloscope or voltmeter.

In view of the foregoing, it is seen that the device of the present invention provides an extensometer that permits a relatively large contact between the sensing element of the extensometer and the surface of the human body under study. The device is easily and conveniently applied to the body and is comfortable to the wearer and is relatively economical to produce.

We claim:

1. A device for measuring expansion and contraction of a surface comprising:
    a conductive elastomeric band having ends and adapted for application around said surface;
    means for restraining said band in contact with said surface whereby said band will expand and contract as said surface expands and contracts;
    means for detecting changes in electrical resistance of said band caused by expansion and contraction thereof on said surface;
    said means for restraining said band including quick-release latch means for latching the ends of said band;
    said latch means comprising a phenolic body having a plurality of slots therein, the surfaces of said slots comprising an electrically conductive metal;
    at least one end of said band being secured to a metallic pin, said pin being shaped to fit firmly in said slots.

2. A device as in claim 1 wherein
    said elastomeric band comprises 400 parts silicon elastomer to 200 parts conductive carbon black;
    means for restraining said band on said surface whereby said band will expand and contract as said surface expands and contracts;
    means for detecting changes in electrical resistance of said band caused by expansion and contraction thereof on said surface;
    the electrical resistance of said band ranging from 12,000 ohms to 18,000 ohms per foot when said band is relaxed and ranging from 24,000 ohms to 32,000 ohms per foot when said band is elongated by 1 inch per foot;
    said means for restraining said band including quick-release latch means for latching the ends of said band.

3. The invention as defined in claim 1 wherein said latch includes means for permitting rapid adjustment in length of said band, said adjustment means including a pair of rollers for clamping portions of said band together.

* * * * *